(12) United States Patent
Hussain et al.

(10) Patent No.: US 7,337,676 B2
(45) Date of Patent: Mar. 4, 2008

(54) DEVICE FOR MEASURING THE MASS RATE OF FLOW

(75) Inventors: Youssif Hussain, Northampton (GB); Vince Cook, Earls Barton (GB); Chris Rolph, Northampton (GB); Tao Wang, Wellingborough (GB)

(73) Assignee: Krohne AG, Basel (CH)

( * ) Notice: Subject to any disclaimer, the term of this patent is extended or adjusted under 35 U.S.C. 154(b) by 0 days.

(21) Appl. No.: 11/567,880

(22) Filed: Dec. 7, 2006

(65) Prior Publication Data

US 2007/0151368 A1    Jul. 5, 2007

(30) Foreign Application Priority Data

Dec. 15, 2005   (DE) .................... 10 2005 060 495

(51) Int. Cl.
*G01F 1/84*    (2006.01)
(52) U.S. Cl. .................... 73/861.357; 73/861.355; 73/861.356
(58) Field of Classification Search ........... 73/861.357, 73/861.355, 861.356
See application file for complete search history.

(56) References Cited

U.S. PATENT DOCUMENTS

| 4,823,614 | A | * | 4/1989 | Dahlin ................. 73/861.357 |
| 4,895,031 | A | | 1/1990 | Cage |
| 5,048,350 | A | | 9/1991 | Hussain et al. |
| 5,349,872 | A | | 9/1994 | Kalotay et al. |
| 5,497,666 | A | | 3/1996 | Patten et al. |
| 5,700,957 | A | * | 12/1997 | Alesz et al. ........... 73/861.357 |

* cited by examiner

*Primary Examiner*—Jewel Thompson
(74) *Attorney, Agent, or Firm*—David S. Safran

(57) ABSTRACT

A mass flow rate measurement device which works according to the coriolis principle, and has two measurement tubes (1) and a vibration converter. It is provided that a carrier (2) is mounted on each of the measurement tubes (1) as a pair of carriers, and the vibration converter is made and arranged such that it acts between the pair carriers (2). In this way, a coriolis mass flow rate measurement device which is simple to produce is attained, with measurement tubes (1) which can be located extremely close to one another.

10 Claims, 4 Drawing Sheets

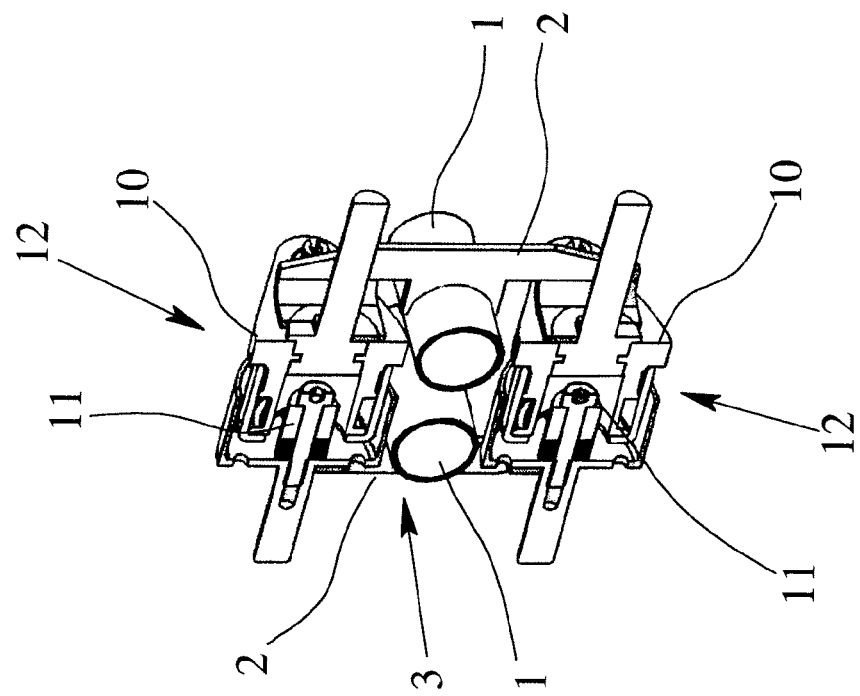
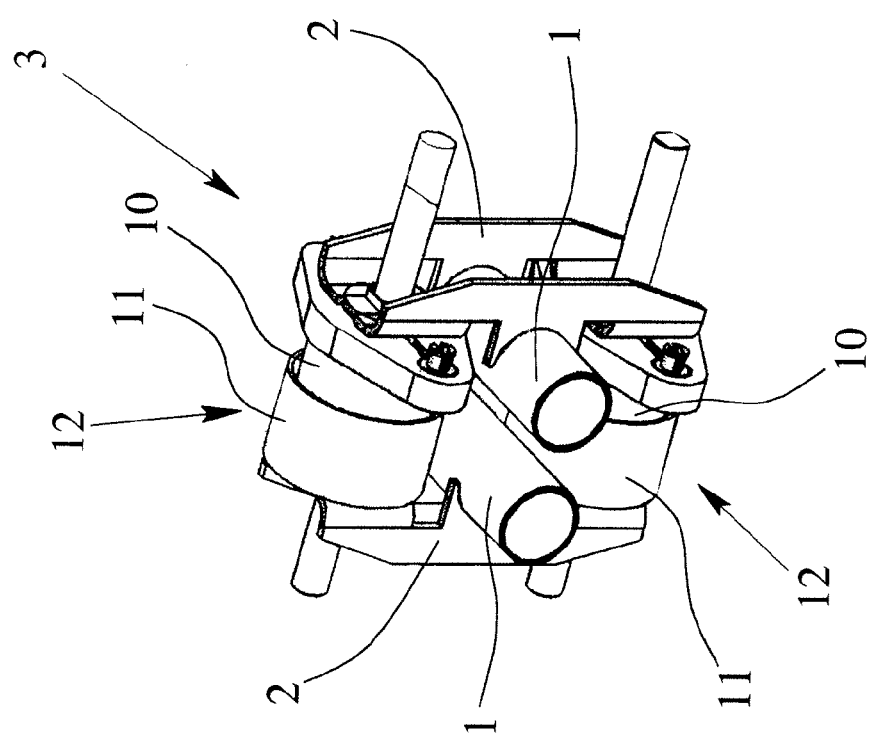
Fig. 3a
Fig. 3b

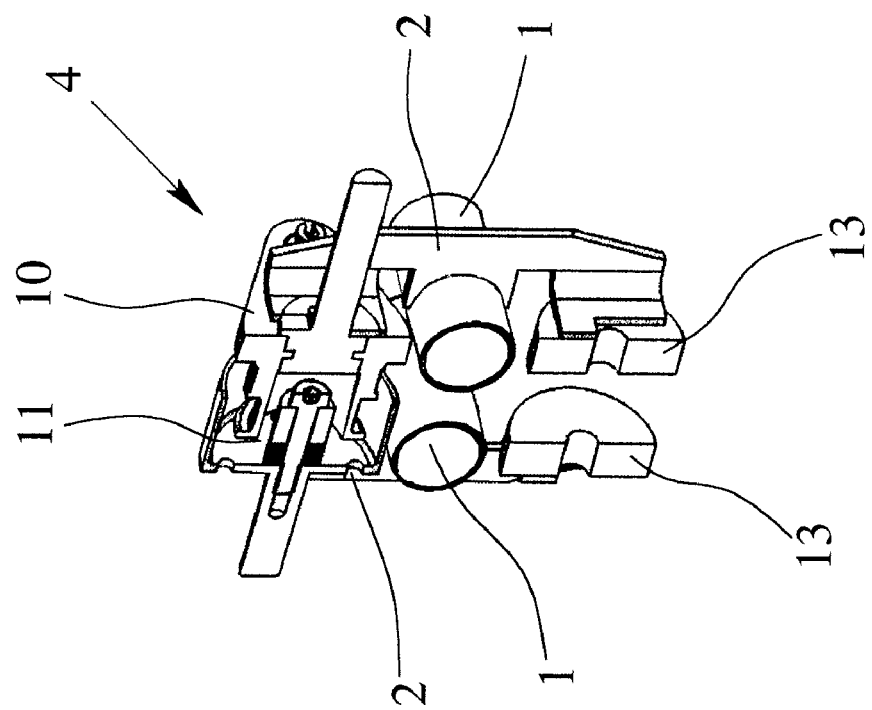
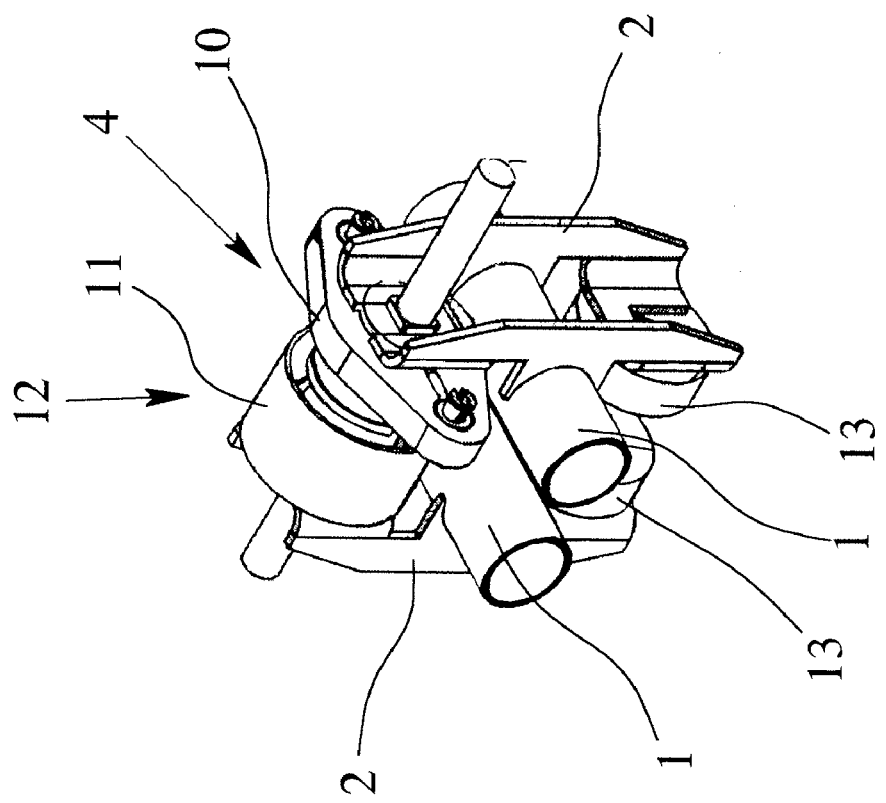
Fig. 4a
Fig. 4b

DEVICE FOR MEASURING THE MASS RATE OF FLOW

BACKGROUND OF THE INVENTION

1. Field of the Invention

The invention relates to a device for measuring the mass rate of flow which works according to the coriolis principle and has two measurement tubes and a vibration converter.

2. Description of Related Art

Coriolis devices for measuring the mass rate of flow with two or more measurement tubes typically have two measurement tubes which run parallel to one another at least in sections, between which there are at least one vibration exciter and at least one vibration sensor as the vibration converter. In this connection, the two measurement tubes can be caused to vibrate differently from one another, the mass of a medium flowing through the measurement tubes typically being determined via phase shifting of the achieved vibrations of the measurement tubes relative to the excitation vibration and between two points on the measurement tubes spaced apart from one another.

In the coriolis mass flow rate measuring device, if there are exactly two straight measurement tubes which run parallel, generally vibration excitation of the two measurement tubes in phase opposition in their common plane, at one resonant frequency is selected. Compared to coriolis measurement devices with only a single measurement tube, it is advantageous that, due to vibrations, the center of gravity of the vibrating system does not change. Viewed from the outside, the coriolis mass flow rate measuring device with two straight measurement tubes running parallel therefore behaves in a manner neutral to vibration, so that no faults due to natural vibration need be feared, since only the two measurement tubes vibrate, while the housing provided for the coriolis mass flow rate measuring device remains at rest. In this way, high zero point stability can be achieved.

The problem in the coriolis mass flow rate measurement devices known from the prior art with at least two measurement tubes is, among others, that they are complex and expensive to produce. In general, specifically, each device is made individually by hand to meet the required low tolerances and in order to be able to mount the individual devices of the coriolis mass flow rate measurement device, such as the vibration exciter and vibration sensor, correctly at all.

SUMMARY OF THE INVENTION

Thus, a primary object of the present invention is to devise such a coriolis mass flow rate measurement device which can be easily produced with high precision and in different dimensions.

Proceeding from the initially described coriolis mass flow rate measurement device, this object is achieved in that a carrier is mounted on each of the measurement tubes, each carrier is attached to exactly one measurement tube and the vibration converter is made and arranged such that it acts between the two carriers.

Therefore, in accordance with the invention, the vibration converter, therefore a vibration exciter or a vibration sensor, does not act directly between the two measurement tubes in order, for example, to excite them to vibrations in phase opposition, but rather between two carriers which, for their part, are each attached to one of the measurement tubes. In this connection, different geometrical designs are possible. According to one preferred development of the invention, it is provided that the carriers are made and arranged such that, at the mounting site of the carriers, the distance available for the vibration converter between the two carriers is greater than the distance between the two measurement tubes. In this way, among other things, the advantage can be achieved that there can be two measurement tubes at only an extremely small distance from one another and nevertheless it remains possible to arrange a vibration converter acting between the two measurement tubes, therefore a vibration exciter for excitation of vibrations or a vibration sensor for detecting the vibrations attained. Thus, coriolis devices for measuring the mass rate of flow with very small dimensions, specifically especially with a short distance between the two measurement tubes, can be attained; this has, for example, advantages with respect to vibration engineering.

Fundamentally, the two measurement tubes can run differently relative to one another. However, according to one preferred development of the invention, it is provided that the two measurement tubes run parallel to one another at least in sections. Here, according to one preferred development of the invention, it is also provided that the carriers are located in the region in which the two measurement tubes run parallel in sections.

Fundamentally, the carriers can be mounted differently on each respective measurement tube, especially also on a respective end region. However, according to a preferred development of the invention, it is provided that the carriers are each mounted on one of the measurement tubes in the middle region. Therefore, this means that the carriers in the region between their two ends are mounted on a respective measurement, so that the respective ends are available for mounting of a vibration converter or a balancing mass. In this connection, there can be attachment of the carrier on one measurement tube exactly in the middle of the carrier; but this is not critically necessary, so that the carrier can extend on different sides of the respective measurement tube to different distances away from it.

In this case, it can be provided that the carriers are arranged perpendicular to the plane spanned by the measurement tubes which run parallel to one another. However, it can also be provided that only the connecting line between the ends of the carriers designed to mount the vibration converter or a balancing mass runs perpendicular to the plane spanned by the tubes which run parallel to one another. In this way, symmetrical configurations are attained which make construction especially simple. Nevertheless, nonsymmetrical designs are also possible.

As stated above, a vibration exciter and vibration sensor can be used as the vibration converter. Typically, in a coriolis mass flow rate measuring device with two measurement tubes which run parallel to one another at least in sections there are one vibration exciter and two vibration sensors. According to one preferred development of the invention, the vibration converter is a vibration exciter which works actively on both sides of the measurement tubes between the carriers. This means that this vibration exciter applies forces leading to vibrations of the measurement tubes not only on one side of the measurement tubes, but on both sides, preferably symmetrically.

Such a vibration exciter can be implemented, for example, via two converter means comprised of a magnet coil and a magnet which extends into the respective magnet coil, as are well known as such from the prior art. These means are then arranged on opposing sides between the two carriers mounted on the respective measurement tube, so that with identical triggering of the two converter means, for example, vibration of the measurement tubes in phase opposition to one another can be achieved essentially without additionally produced torsion vibrations.

Fundamentally, a vibration sensor designed for the coriolis mass flow rate measurement device can be built in the same way. According to a preferred development of the invention, it is however provided that the vibration converter is a vibration sensor which acts simply on one side of the measurement tube between the carriers. This means that, for example, there is only a single converter means composed of a magnet coil and a magnet which extends into the magnet coil and which is provided on one side of the measurement tubes while, on the other side of the measurement tubes, the vibrations of the measurement tubes are not detected. In this connection, according to a preferred development of the invention it is also provided that, on the side opposite the vibration sensor, there is a balancing mass, preferably with a mass which corresponds to the mass of the vibration sensor on the other side. In this way, again a symmetrical construction is achieved with which torsion vibrations of the measurement tubes are for the most part suppressed.

Finally, the carriers can be mounted differently on the measurement tubes and along a different region. According to a preferred development of the invention, it is however provided that the carriers are each attached to the respective measurement tube along a peripheral region which rises 180°. This means that the respective carrier is mounted along a region on a respective measurement tube which comprises more than half of the periphery of the measurement tube, by which torsion vibrations of the measurement tube are additionally suppressed.

It has been repeatedly stated above which measures are suited to suppressing torsion vibrations of the measurement tubes. This suppression of torsion vibrations is especially desirable when vibration of the two measurement tubes in phase opposition is to be achieved. Nevertheless, providing carriers on the measurement tubes for a vibration converter in accordance with the invention, is also fundamentally suited for cases in which torsion vibrations are to be intentionally excited.

The invention is explained in detail below with reference to the drawings.

BRIEF DESCRIPTION OF THE DRAWINGS

FIGS. 3a & 3b show the design for the vibration exciter, and FIGS. 4a & 4b show the design for a vibration sensor.

DETAILED DESCRIPTION OF THE INVENTION

Figure 1:
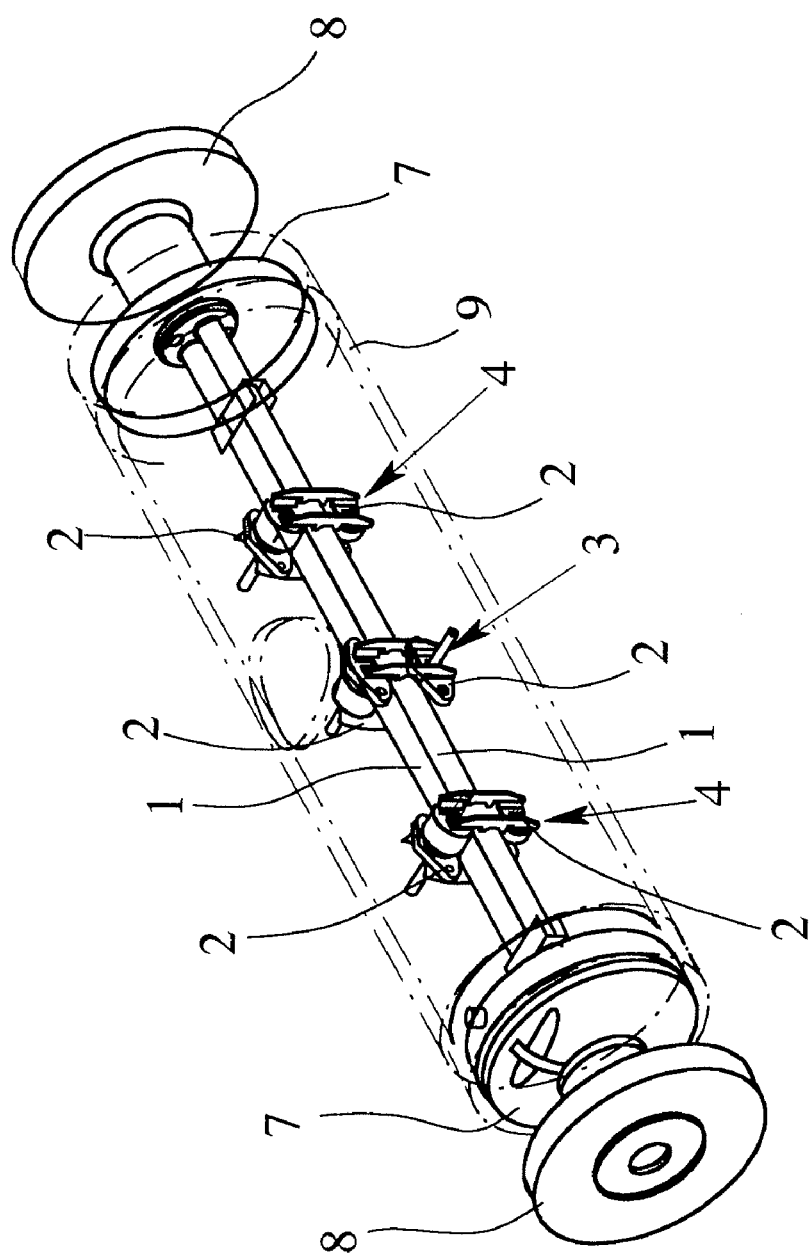
FIG. 1 is a perspective view of the overall design of a coriolis device for measuring the mass rate of flow according to a preferred embodiment of the invention.
Figure 2:
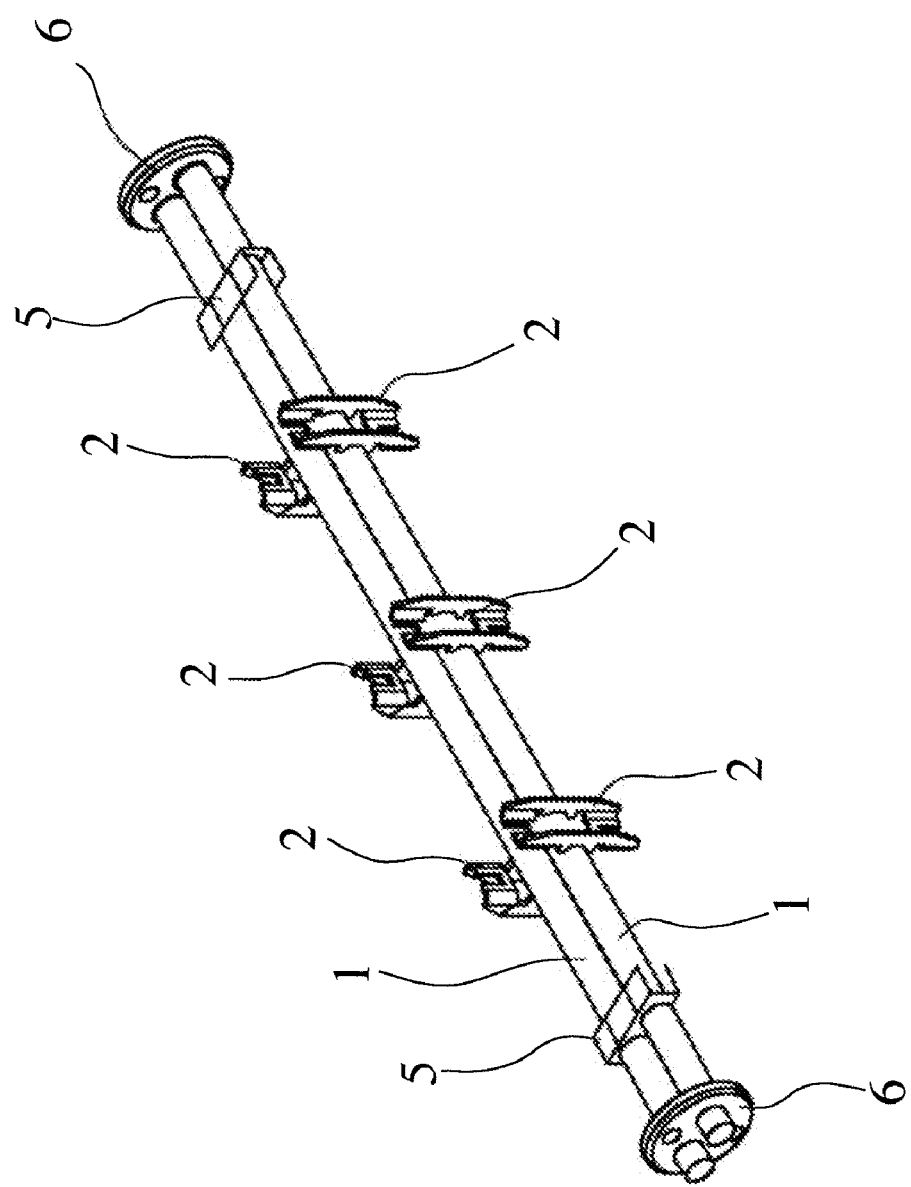
FIG. 2 shows the interconnected measurement tubes of the coriolis mass flow rate measurement device according to the preferred embodiment of the invention with carriers mounted thereon for a vibration exciter and two vibration sensors.

As is apparent from FIG. 1 which shows the overall construction of a coriolis mass flow rate measurement device according to the preferred embodiment of the invention described here, the measurement device has two measurement tubes 1 which run parallel to one another over their entire length. Each measurement tube mounts two carriers 2 at a time, such that their lengthwise extension runs perpendicular to the plane spanned by the two measurement tubes 1 which run parallel to one another.

As is especially apparent from FIGS. 2, 3a & 3b and 4a & 4b, the carriers 2 are each attached to a measurement tube 1 from the outside, the carriers 2 also being made such that the distance available for the arrangement of a vibration converter between the carriers 2, such as a vibration exciter 3 or a vibration sensor 4, is greater than the distance between the two measurement tubes 1. This is advantageous for mounting the vibration converter with small dimensions of the measurement device, especially for a short distance between the two measurement tubes 1, and also has advantages for vibration engineering. Otherwise, the extremely short distances between the two measurement tubes 1 is only possible at all in this way.

The two measurement tubes 1 are interconnected by means of two vibration node plates 5. These two vibration node plates 5 define the actual measurement range of the measurement tubes, within which vibration deflection of the measurement tubes 1 relative to one another takes place. On each of the ends of the two measurement tubes 1 there is a respective connecting plate 6, by means of which the system comprised of the two measurement tubes 1, the carriers 2, the vibration exciter 3, the vibration sensors 4 and the vibration node plates 5 is connected via connecting pieces 7 to end flanges 8 of the coriolis mass flow rate measurement device. A housing 9 which surrounds and protects the measurement tubes 1 with their devices extends between the connecting pieces 7.

Tube transitions from one tube to two tubes, specifically from the individual tube of the tubing system in which the coriolis mass flow rate measurement device is installed, to the two measurement tubes 1 of the device is not especially apparent from the figures. These tube transitions are located in the region of the connecting pieces 7 and ensure a symmetrical transition from one individual tube to the two measurement tubes 1 and on the other end of the measurement tubes 1 back again to the individual tube.

At this point, it is particularly apparent from FIGS. 3a & 3b and 4a & 4b how the vibration exciter 3 and the vibration sensor 4 are attached to the measurement tubes 1. In both cases, there are two carriers 2 which are each attached, preferably welded, from the outside to one of the two measurement tubes 1 which run parallel to one another. Thus, the carriers 2 run on the respective outer side of the measurement tubes 1 essentially perpendicular to the plane spanned by the measurement tubes 1. The carriers 2 are made symmetrically and in their middle region are each attached to one measurement tube 1. Thus, the carriers extend out the same distance on either side of the measurement tubes 1.

In the end areas of the carriers 2, there are now a magnet coil 10 and a magnet 11 which extends into the respective carrier, so that the vibration exciter is formed overall by two converter means 12 with a magnet coil 10 and a magnet 11 which extends into it. In this connection, there is vibration excitation here in which the two converter means 12 of the vibration exciter 3 are triggered in the same way so that, between the carriers 2, the same forces are acting on both sides and lead altogether to vibration excitation of the measurement tubes 1 in phase opposition, and are excited essentially without the torsion vibrations of the measurement tubes 1.

To suppress the excitation of torsion vibrations, it is otherwise provided that the carriers 2 are attached along a peripheral area of each measurement tube 1 which exceeds 180°. This type of attachment of the carriers 2 to the measurement tubes 1 is provided both in the case of the vibration exciter 3 and also in the case of the vibration converter 4.

In contrast to the vibration exciter, in the vibration sensors, however, instead of a second converter means, there are two balancing masses 13. This means that there is a converter means 12 only on one side of the measurement tubes 1, while on the other side there is simply a passively acting mass on the carriers 2 which corresponds to the mass of the individual converter means 12 of the vibration sensor, here in the form of two balancing masses 13 with a total mass therefore corresponding to the mass of the opposing converter means 12 which forms the vibration sensor 4. Providing a balancing mass likewise constitutes a measure for suppressing the excitation of torsion vibrations due to asymmetrical mass distributions.

As a result, such a coriolis mass flow rate measurement device is thus provided in which the vibration exciter 3 and the vibration converter 4 can be easily installed, and in this connection, an extremely short distance between the measurement tubes 1 can be achieved.

What is claimed is:

1. Coriolis mass flow rate measurement device, comprising:
    two measurement tubes and
    a vibration converter,
    wherein at least one carrier is mounted on each of the measurement tubes as a pair of carriers, each carrier of the pair being attached to exactly a respective one of the two measurement tubes;
    wherein the vibration converter is adapted to act between the carriers of a respective pair of carriers;
    wherein the carriers are each mounted on the measurement tubes in a middle region; and
    wherein the vibration converter is one of a vibration exciter and a vibration sensor.

2. Mass flow rate measurement device in accordance with claim 1, wherein the carriers are constructed and arranged such that the distance at a mounting site of the carriers available between the two carriers for receiving the vibration converter is greater than the distance between the two measurement tubes.

3. Mass flow rate measurement device in accordance with claim 1, wherein the two measurement tubes run parallel to one another at least in sections.

4. Mass flow rate measurement device in accordance with claim 3, wherein the carriers are located in the region in which the two measurement tubes run parallel.

5. Mass flow rate measurement device in accordance with claim 1, wherein the vibration converter is a vibration exciter which works actively on both sides of the measurement tubes between the carriers.

6. Mass flow rate measurement device in accordance with claim 1, wherein the vibration converter is a vibration sensor which acts on one side of the measurement tubes between the carriers.

7. Mass flow rate measurement device in accordance with claim 6, wherein a balancing mass is provided on a side opposite the vibration sensor.

8. Mass flow rate measurement device in accordance with claim 1, wherein the carriers are each attached to the respective measurement tube along a peripheral region which spans at least 180°.

9. Mass flow rate measurement device in accordance with claim 1, wherein each measurement tube mounts a plurality carriers forming a plurality of spaced pairs of carriers, the lengthwise extension of which runs perpendicular to a plane spanned by the two measurement tubes.

10. Mass flow rate measurement device in accordance with claim 9, wherein the vibration converter of one of at least one said plurality of pairs of carriers is a vibration exciter which works actively on both sides of the measurement tubes between the carriers; and wherein the vibration converter of one of at least one other of said plurality of pairs of carriers is a vibration sensor which acts on one side of the measurement tubes, a balancing mass being provided on a side opposite the vibration sensor.

* * * * *